Figure 1:
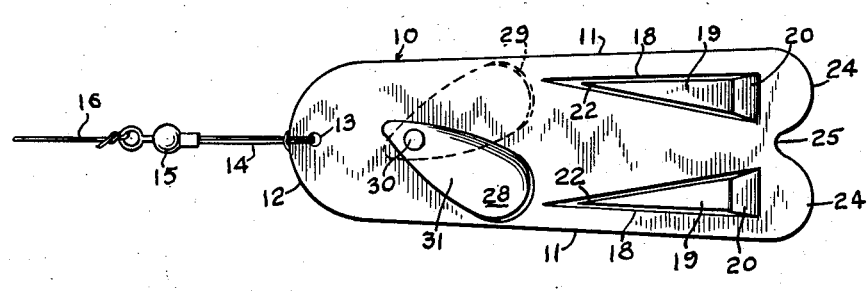

Nov. 3, 1964 D. S. MUTTI 3,154,877

FISHING LURE

Original Filed Jan. 15, 1960

INVENTOR.
DANIEL S. MUTTI
BY
ATTORNEY

3,154,877
FISHING LURE
Daniel S. Mutti, Rte. 1, Box 13, McGregor, Minn.
Original application Jan. 15, 1960, Ser. No. 2,647, now Patent No. 3,081,573, dated Mar. 19, 1963. Divided and this application Jan. 3, 1963, Ser. No. 249,254
4 Claims. (Cl. 43—42.51)

This invention relates to a fishing lure and is a division of my co-pending application Serial No. 2,647, filed January 15, 1960, now Patent No. 3,081,573, granted March 19, 1963.

As in the co-pending application referred to, an important object of the invention is to eliminate the usual hooks and to embody hooks as a part of the lure itself.

A further object is to provide such a lure formed of sheet material having hooks integral therewith and stamped from the material thereof wholly within the limits of the area thereof, thus eliminating the use of conventional hooks attached to devices of this character.

A further object is to provide such a lure which comprises a relatively flat body, the hooks of which are struck therefrom to extend on opposite sides thereof to engage in the mouth of the fish.

A further object is to provide a lure of this character wherein the edges of the body referred to are smooth from end to end whereby the device, when a fish is caught, may be removed very readily from the gills of the fish after disconnecting the swivel connected to the lead line.

A further object is to provide novel elements associated with the body of the lure to cause the latter to wobble or rotate as it passes through the water, and which elements are adjustable to vary the action of the lure in moving through the water.

Other objects and advantages of the invention will become apparent during the course of the following description.

Figure 2:
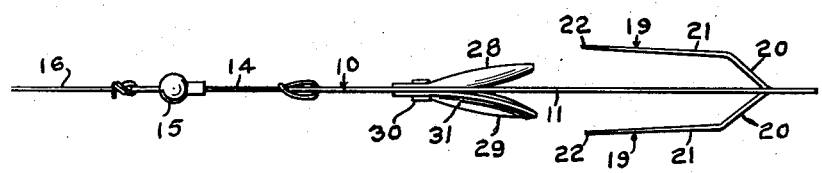

In the drawing I have shown one embodiment of the invention. In this showing:

FIGURE 1 is a face view of the lure; and
FIGURE 2 is an edge elevation thereof.

Referring to the drawing, numeral 10 designates the body of the lure formed, as will be clear from FIGURE 1, from a single sheet of a relatively stiff and strong material such as stainless steel. The body is provided with straight longitudinal edges 11 extending through the greater portion of the length of the body. The forward end of the body is preferably rounded as at 12 and is provided with an opening 13 for connection with a leader 14, the forward end of this leader being connected to a conventional swivel 15, which, in turn, is connected to the usual line 16. The swivel is preferably of the detachable type, although it will become apparent that some other detachable device may be connected in the line as a whole for a purpose to be described. For example, the end of the line 16 may be suitably connected by a snap to the eye of the swivel 15, if desired.

Toward its rear end, the body is punched as at 18 along angular lines at opposite sides of the longitudinal center of the body to form tongues 19. These tongues are bent in opposite directions from the plane of the body as at 20 to form hooks 21 having pointed forward ends 22.

The rear end of the body is preferably provided with two curved portions 24 lying on opposite sides of the longitudinal center of the body, the latter at its rear extremity being indented as at 25 between the rounded portions 24.

The openings 18 are formed mostly toward the rear end of the body and the latter is substantially solid and unbroken from the forward ends of the openings 18 to the forward end of the body. To opposite sides of such solid body portion is fixed a pair of blades 28 and 29 having curved sides terminating in narrow forward ends secured together through the body by a single friction rivet 30. Each blade has its outer face dished as at 31, and in use, the two blades diverge rearwardly at opposite sides of the longitudinal center of the body.

Operation

The usual conventional fish hooks are eliminated in favor of the hooks 21 formed as an integral part of and offset from the plane of the body 10. In the use of the device, the lure is pulled through the water in the usual manner, and it may be trolled at any depth by the connection of suitable sinkers at any point ahead of the lure, for example, connected to the eye of the swivel 15. With the blades 28 and 29 diverging rearwardly of the lure, the dished faces of these blades, which also diverge from the plane of the body 10, cause the lure to wobble or rotate in the water. With the blades arranged as shown, there will be a definite rotation of the body as it moves through the water. If a fish seizes the lure from the rear thereof, the hooks 21 will catch in the fish's mouth, whereupon the line may be reeled in and the fish boated in the usual manner. As is well-known, conventional hooks are removable only with difficulty. With the present device, the swivel 15 or other suitable means is disconnected to release the lure from the line 16 whereupon the lure may be withdrawn through one of the gills of the fish. Attention is invited to the fact that opposite edges 11 of the body are straight and smoothly continuous substantially from end to end of the body. These edges are either parallel or, as is preferably the case, converge in a slight angle toward the forward end of the lure. These smooth side edges facilitate the removal of the lure from a fish's gill. The movement in removing the device is away from the points 22, so that removal of the lure in the manner stated is quite easy.

Two of the hooks 21 have been illustrated, but additional hooks may be formed in the body of the lure, if desired. These hooks extend laterally from the surfaces of the body 10 and thus break up the smooth continuity of the body as is true also of the blades 28 and 29. These elements projecting from the plane of the body tend to attract the attention of the fish, which attraction is enhanced if the body is made of stainless steel and polished so as to gleam in the water. If the blades 28 and 29 are arranged in alignment with the longitudinal center of the body 10, the projection of the hooks 21, unequally resisting at opposite sides the movement of the device through the water, will cause the device to wobble. If the blades 28 and 29 diverge, then the device will rotate on its longitudinal center as an axis as it is drawn through the water.

It is to be understood that the form of the invention shown and described is to be taken as a preferred example of the same and that various changes in the shape, size and arrangement of the parts may be made as do not depart from the spirit of the invention or the scope of the appended claims.

I claim:
1. A fishing lure comprising a relatively flat body of stiff material having a forward end adapted for connection with a leader, said body being at least as wide at the rear end as at the forward end and having smooth, unbroken side edges substantially from end to end of said body, said body having angularly formed stamped slots wholly spaced inwardly from said side edges, the material stamped from said slots forming elongated tongues extending longitudinally of the lure and having forwardly extended pointed ends to provide fish hooks, such hooks being offset from said body.

2. A fishing lure comprising a relatively flat elongated body of stiff sheet material having relatively straight longitudinal edges and having a forward end adapted for connection with a leader, said body being at least as wide at the rear end as at the forward end and toward the rear end thereof having angularly formed slots wholly spaced inwardly from said straight longitudinal edges and from the ends of said body to provide said body with forwardly extended pointed flesh-piercing elongated tongue portions extending generally longitudinally of the lure, said tongue portions being offset from opposite faces of said body to form hooks.

3. A fishing lure comprising a relatively flat elongated body of stiff sheet material having relatively straight longitudinal edges and having a forward end adapted for connection with a leader, said body being at least as wide at the rear end as at the forward end and toward the rear end thereof having angularly formed slots wholly spaced inwardly from said longitudinal edges and from the ends of said body to provide said body with forwardly extended pointed flesh-piercing elongated tongues extending generally longitudinally of the lure, said tongues being offset from opposite faces of said body to form hooks, and means carried by said body toward the forward end thereof for effecting rotation of the lure as it passes through the water.

4. A fishing lure comprising a relatively flat body of stiff sheet material having a forward end adapted for connection with a leader and having smooth unbroken side edges from end to end, said side edges being straight throughout the greater portions of their lengths, said body being at least as wide at its rear end as at its forward end, said body being provided with angularly formed slots wholly spaced inwardly from said straight side edges and from the ends of said body to provide said body with forwardly extended pointed flesh-piercing elongated tongues extending generally longitudinally of the lure, said tongues being offset from said body to form hooks, a pair of blades arranged against opposite faces of said body forwardly of said tongues, and means for frictionally holding said blades against said body for adjustment to different angular positions relative to said body to effect rotation of the lure as it passes through the water.

References Cited by the Examiner

UNITED STATES PATENTS

| | | | |
|---|---|---|---|
| 632,554 | 9/99 | Dukes | 43—42.51 |
| 1,558,249 | 10/25 | De Zeng | 43—42.51 X |
| 2,345,197 | 3/44 | Hirsch et al. | 43—44.82 |
| 2,590,167 | 3/52 | Fasano et al. | 43—42.51 X |
| 2,617,228 | 11/52 | Fasano et al. | 43—42.51 |
| 2,717,468 | 9/55 | Clough | 43—42.51 |

FOREIGN PATENTS

| | | |
|---|---|---|
| 958,469 | 9/49 | France. |
| 591,198 | 8/47 | Great Britain. |
| 262,197 | 9/49 | Switzerland. |

SAMUEL KOREN, *Primary Examiner.*